US010663928B2

(12) United States Patent
Yonemoto (10) Patent No.: US 10,663,928 B2
(45) Date of Patent: May 26, 2020

(54) ELECTRONIC DEVICE

(71) Applicants:KABUSHIKI KAISHA TOSHIBA, Minato-ku, Tokyo (JP); Toshiba Infrastructure Systems & Solutions Corporation, Kawasaki-shi, Kanagawa (JP)

(72) Inventor: Satoshi Yonemoto, Tokorozawa Saitama (JP)

(73) Assignees: KABUSHIKI KAISHA TOSHIBA, Tokyo (JP); Toshiba Infrastructure Systems & Solutions Corporation, Kanagawa (JP)

( * ) Notice: Subject to any disclaimer, the term of this patent is extended or adjusted under 35 U.S.C. 154(b) by 343 days.

(21) Appl. No.: 15/902,874

(22) Filed: Feb. 22, 2018

(65) Prior Publication Data

US 2018/0181084 A1 Jun. 28, 2018

Related U.S. Application Data

(63) Continuation of application No. PCT/JP2015/080123, filed on Oct. 26, 2015.

(51) Int. Cl.
*G05B 9/02* (2006.01)
*G06F 11/30* (2006.01)
*G06F 11/14* (2006.01)
*G06F 11/07* (2006.01)
*G06F 11/00* (2006.01)
*G05B 19/042* (2006.01)
*G05B 23/02* (2006.01)

(52) U.S. Cl.
CPC ........... *G05B 9/02* (2013.01); *G05B 19/0428* (2013.01); *G05B 23/02* (2013.01); *G06F 11/00* (2013.01); *G06F 11/076* (2013.01); *G06F 11/1441* (2013.01); *G06F 11/30* (2013.01)

(58) Field of Classification Search
None
See application file for complete search history.

(56) References Cited

U.S. PATENT DOCUMENTS 4,481,629 A 11/1984 Hatata et al.
4,538,266 A * 8/1985 Miki ........................ G06F 11/25
341/118

(Continued)

FOREIGN PATENT DOCUMENTS

JP 56-86015 A 7/1981
JP 63-73158 A 4/1988

(Continued)

OTHER PUBLICATIONS

International Search Report received in PCT Patent Application No. PCT/JP2015/080123 dated Dec. 15, 2015 in 7 pages.

*Primary Examiner* — Jas A Sanghera
(74) *Attorney, Agent, or Firm* — Knobbe, Martens, Olson & Bear, LLP (57) ABSTRACT

According to one embodiment, an electronic device comprises an integrated circuit and a processor. The processor is configured to: determine whether there is an abnormality occurring in the integrated circuit; and stop power supply to the integrated circuit if there is an abnormality occurring in the integrated circuit, and supply power to the integrated circuit after stopping the power supply for a predetermined time.

3 Claims, 6 Drawing Sheets

(56) References Cited

U.S. PATENT DOCUMENTS

| | | | |
|---|---|---|---|
| 4,786,862 | A | 11/1988 | Sieron |
| 6,822,424 | B2 | 11/2004 | Odaohhara |
| 2004/0015302 | A1 | 1/2004 | Suzuki et al. |
| 2010/0169620 | A1 | 7/2010 | Minami |

FOREIGN PATENT DOCUMENTS

| | | |
|---|---|---|
| JP | 08-023276 A | 1/1996 |
| JP | 2000-259201 A | 9/2000 |
| JP | 2003-173220 A | 6/2003 |
| JP | 2009-168628 | 7/2009 |
| JP | 2011-209232 A | 10/2011 |
| KR | 2003-0082927 | 10/2003 |
| KR | 10-2010-0076904 | 7/2010 |

\* cited by examiner

F I G. 6 ic device.

ELECTRONIC DEVICE

CROSS-REFERENCE TO RELATED APPLICATIONS

This application is Continuation Application of PCT Application No. PCT/JP2015/080123, filed Oct. 26, 2015, the entire contents of which are incorporated herein by reference.

FIELD

Embodiments described herein relate generally to an electronic device.

BACKGROUND

Some electronic devices include an integrated circuit (IC) for fulfilling a function of an analog-digital converter (ADC), a digital-analog converter (DAC), or the like. In such electronic devices, the IC sometimes experiences an abnormality, such as a fluctuation of circuit power supply, or stoppage or runaway of a function due to noise, etc. If an abnormality occurs in the IC included in the electronic device, the entire device including the IC is reset by turning off the device once and thereafter turning on the device again.

DETAILED DESCRIPTION

According to one embodiment, an electronic device comprises an integrated circuit and a processor. The processor is configured to: determine whether there is an abnormality occurring in the integrated circuit; and stop power supply to the integrated circuit if there is an abnormality occurring in the integrated circuit, and supply power to the integrated circuit after stopping the power supply for a predetermined time.

First Embodiment

The first embodiment will be described.

An electronic device according to this embodiment is a device that includes at least one integrated circuit (IC). The electronic device according to this embodiment is not limited to a particular device. Hereinafter, an example of an electronic device as a flow meter that measures a value of a flow volume, etc., of a fluid is described. For example, the electronic device as a flow meter uses Faraday's law of electromagnetic induction to calculate, for example, a value of a flow volume of a fluid that flows in a measurement tube, from an induced electromotive force generated by a detector, and sends the calculated value of the flow volume to an external device, or the like.

Figure 1:
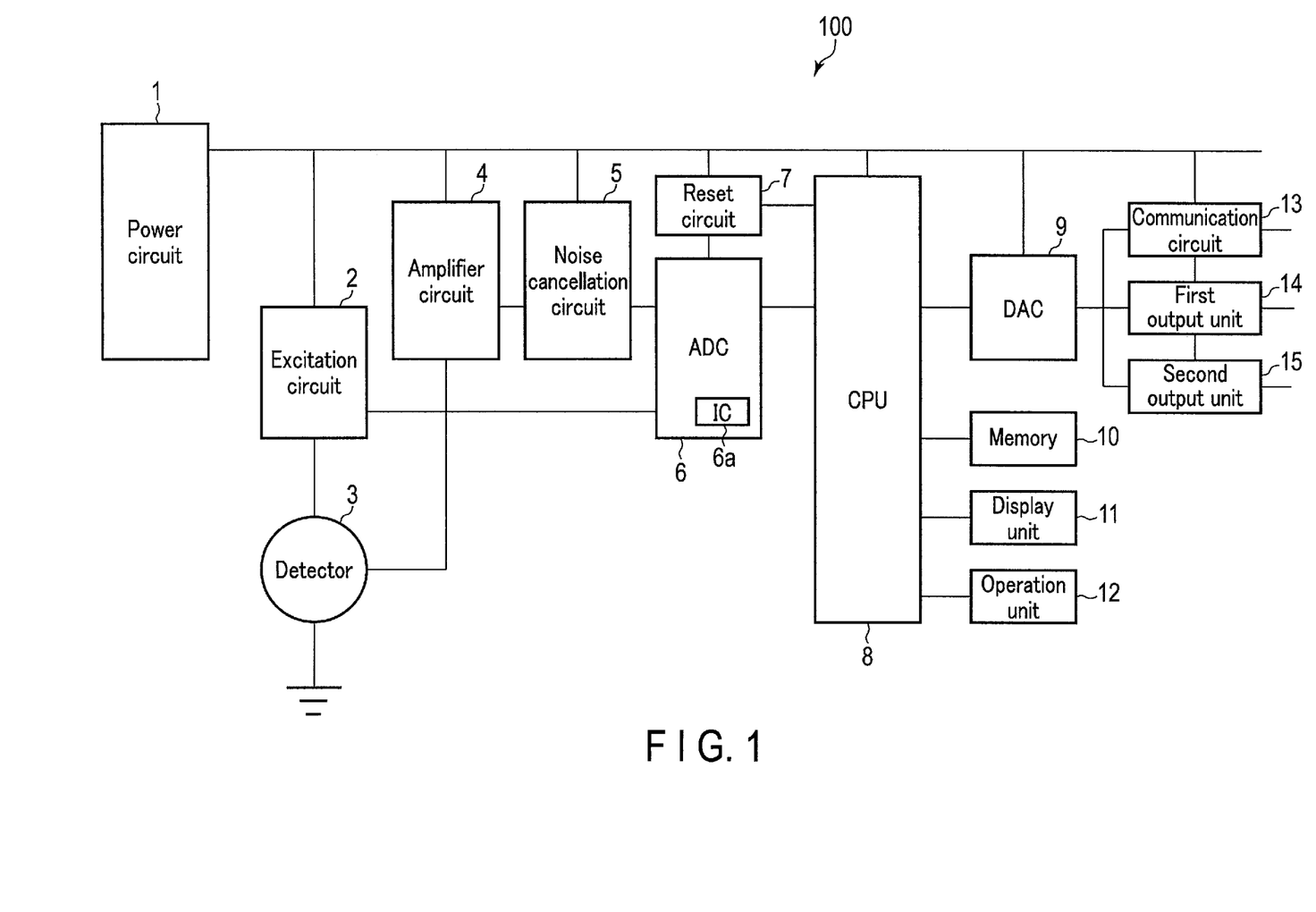
FIG. 1 is a block diagram showing a configuration example of an electronic device according to a first embodiment.

FIG. 1 shows a configuration example of a flow meter as an electronic device 100 according to the present embodiment.

In the configuration shown in FIG. 1, the electronic device 100 includes a power circuit 1, an excitation circuit 2, a detector 3, an amplifier circuit 4, a noise cancellation circuit 5, an ADC 6, a reset circuit 7, an CPU 8, a DAC 9, a memory 10, a display unit 11, an operation unit 12, a communication circuit 13, a first output unit 14, a second output unit 15, etc.

The power circuit 1 is electrically connected to each unit of the electronic device 100, and supplies power to each unit. For example, the power circuit 1 transforms a voltage supplied from an external device into a predetermined voltage, and supplies the voltage to each unit.

The excitation circuit 2 is electrically connected to the detector 3. The excitation circuit 2 supplies power for excitation to the detector 3 by using the power supplied from the power circuit 1. The excitation circuit 2 may control the excitation state of the detector 3.

The detector 3 (measurement unit) measures a flow rate (object to be measured) of a fluid, etc. that flows in a measurement tube or the like. Namely, the detector 3 measures the flow rate and outputs the result of the measurement as an analog signal. In this embodiment, the detector 3 detects an induced electromotive force for measuring the flow rate of the fluid that flows in the measurement tube, etc. For example, the detector 3 has a coil on a side surface of the measurement tube so as to generate a magnetic field in a direction perpendicular to the measurement tube. Also, the detector 3 has two measuring electrodes on an inner wall of the measurement tube in a direction perpendicular to the direction of the magnetic field. The detector 3 uses the measuring electrodes to detect an induced electromotive force generated by the magnetic field generated from the coil and the fluid flowing in the measurement tube.

In addition, the detector 3 is electrically connected to the amplifier circuit 4. The detector 3 supplies the detected induced electromotive force to the amplifier circuit 4. Namely, the measuring electrodes of the detector 3 supply the generated induced electromotive force to the amplifier circuit 4.

The amplifier circuit 4 amplifies the induced electromotive force supplied from the detector 3. The amplifier circuit 4 is electrically connected to the noise cancellation circuit 5. The amplifier circuit 4 supplies the amplified induced electromotive force to the noise cancellation circuit 5.

The noise cancellation circuit 5 cancels noise from the induced electromotive force supplied from the amplifier circuit 4. The noise cancellation circuit 5 is electrically connected to the ADC 6. The noise cancellation circuit 5 supplies, to the ADC 6, the induced electromotive force from which noise has been canceled.

The ADC 6 converts the induced electromotive force supplied from the noise cancellation circuit 5 into a digital signal. The ADC 6 is electrically connected to the CPU 8. The ADC 6 supplies the digital signal to the CPU 8. The ADC 6 includes an IC 6a. The IC 6a, for example, functions to convert the induced electromotive force into a digital signal. The ADC 6 may be the IC 6a.

The reset circuit 7 (reset unit) is electrically connected to the CPU 8 and the IC 6a. The reset circuit 7 resets the IC 6a based on a signal from the CPU 8. Namely, the reset circuit 7 stops power supply to the IC 6a, and starts the power supply to the IC 6a again after a predetermined waiting (stopping) time elapses. The waiting time is a time needed to reset the IC 6a. For example, the waiting time may be determined according to the characteristics of the IC 6a. The waiting time may also be determined based on the capacitance in the IC 6a, etc. In general, the waiting time for the IC may be from several milliseconds to several seconds.

Also, the reset circuit 7 may function as a power circuit that supplies power to the ADC 6 and the IC 6a. The reset circuit 7 may stop power supply to the ADC 6 and start power supply to the ADC 6 again after a predetermined time elapses.

The CPU 8 functions to control the operation of the entire electronic device 100. The CPU 8 is electrically connected to the DAC 9, memory 10, display unit 11, operation unit 12, etc. The CPU 8 may include an inner cache, various interfaces, etc. The CPU 8 implements various kinds of processing by executing a program stored in advance in the inner memory, the memory 10, or the like. A function fulfilled by the CPU 8 will be detailed later.

The DAC 9 receives, for example, a digital signal indicating a value of a flow volume from the CPU 8, and converts the received digital signal into an analog signal. The DAC 9 is electrically connected to the communication circuit 13, the first output unit 14, and the second output unit 15. The DAC 9 outputs the analog signal to an external device through the communication circuit 13, the first output unit 14, or the second output unit 15. For example, the DAC 9 outputs, in an electric current value of 4 to 20 mA, a result of converting a proportion of the value of the flow volume in a preset measurement range into a percentage, as an analog signal indicating the value of the flow volume.

The DAC 9 may output a standardized signal, etc., based on the value of the flow volume, etc., to an external device through the first output unit 14. The standardized signal is, for example, a signal indicating that the value of the flow volume exceeds a predetermined value. In this case, the external device can recognize that the value of the flow volume exceeds a predetermined value based on the standardized signal received from the electronic device.

The DAC 9 may also output a pulse, etc., based on the value of the flow volume, etc., to the external device through the second output unit 15. The pulse is output as a waveform signal indicating the value of the flow volume. In this case, the external device can recognize the value of the flow volume based on the pulse received from the electronic device.

The memory 10 is electrically connected to the CPU 8. The CPU 8 stores various kinds of data in a volatile or non-volatile manner. The memory 10 stores, for example, a program to be executed by the CPU 8. The memory 10 may also store the value of the flow volume, etc., according to a signal from the CPU 8.

The display unit 11 displays various kinds of information based on a signal from the CPU 8. The display unit 11 displays the calculated value of the flow volume, etc. The display unit 11 is, for example, configured by a liquid crystal display device.

The operation unit 12 converts an operation input by an operator or the like into an electrical signal, and transmits the signal to the CPU 8. The operation unit 12 is a keyboard, numeric keypad, mouse, touch panel, infrared switch, or the like. If the operation unit 12 is configured by a touch panel, the operation unit 12 may be integrally formed with the display unit 11.

The communication circuit 13 is an interface that transmits the analog signal indicating the value of the flow volume to the external device.

The first output unit 14 is an interface that outputs the standardized signal based on the value of the flow volume.

The second output unit 15 is an interface that outputs the pulse based on the value of the flow volume.

The communication circuit 13, first output unit 14, and second output unit 15 may be configured as one input-output unit.

Next, the function fulfilled by the CPU 8 will be described.

The CPU 8 functions to calculate a flow volume of a fluid that flows inside the measurement tube based on a value detected by the detector 3. For example, the CPU 8 calculates a value of a flow rate based on the relation between the value of the flow rate and the value of the voltage of the induced electromotive force indicated by the digital signal from the ADC 6. The CPU 8 may calculate a value of a flow rate from the value of the voltage of the induced electromotive force based on the properties of the detector 3, the amplifier circuit 4, etc. Also, the CPU 8 takes the integral of the calculated value of the flow rate with respect to time, to calculate the flow volume.

The CPU 8 stores the calculated value of the flow volume in the memory 10.

The CPU 8 transmits the digital signal indicating the value of the flow volume to the DAC 9. The CPU 8 may transmit a signal to output the standardized signal to the DAC 9 if a predetermined value of a flow volume is reached. The CPU 8 may also transmit a signal to output the pulse to the DAC 9 if a predetermined condition is satisfied.

The CPU 8 has an abnormality determination function (determination unit) to determine whether there is an abnormality occurring in the IC 6a. By this abnormality determination function, the CPU 8 determines whether it is necessary to reset the IC 6a in terms of hardware (hereinafter referred to as a hardware reset). The hardware reset is a reset performed by physically stopping power supply to the IC 6a and thereafter starting power supply to the IC 6a again. The abnormality that requires the hardware reset is one that cannot be solved by a software reset (which is not a reset performed by physically stopping and starting power supply but is a reset performed by software by using a reset signal from the CPU 8, for example).

For example, if the IC 6a outputs the same value a predetermined number of times, the CPU 8 determines that there is an abnormality that requires a hardware reset occurring in the IC 6a. Namely, the CPU 8 can count the number of times at which a value received from the IC 6a, and a value received immediately before it, consecutively match each other, and if the number reaches a predetermined number of times, can determine that there is an abnormality that requires a hardware reset occurring in the IC 6a. As a specific example, the CPU 8 may determine that there is an abnormality that requires a hardware reset occurring in the IC 6a if the IC 6a outputs the same value five times in a row.

The IC 6a outputs the result of the measurement of the induced electromotive force as a digital signal. As such, the possibility that the IC 6a repeatedly outputs the same value is very low in a normal state. Therefore, if the IC 6a consecutively outputs the same value, it can be determined that an abnormality is occurring in the IC 6a.

The method in which the CPU 8 determines that there is an abnormality that requires a hardware reset occurring in the IC 6a is not limited to a particular method. For example, the CPU 8 may determine that there is an abnormality that requires a hardware reset occurring in the IC 6a if the IC 6a outputs an abnormal value.

The CPU 8 functions to transmit a hardware reset signal to subject the IC 6a to a hardware reset to the reset circuit 7 if determining that there is an abnormality that requires a hardware reset occurring in the IC 6a. If the CPU 8 transmits the hardware reset signal to the reset circuit 7, the reset circuit 7 stops power supply to the IC 6a, and supplies power to the IC 6a again after a predetermined waiting time elapses.

An example of an operation of the electronic device 100 will be described.

Figure 2:
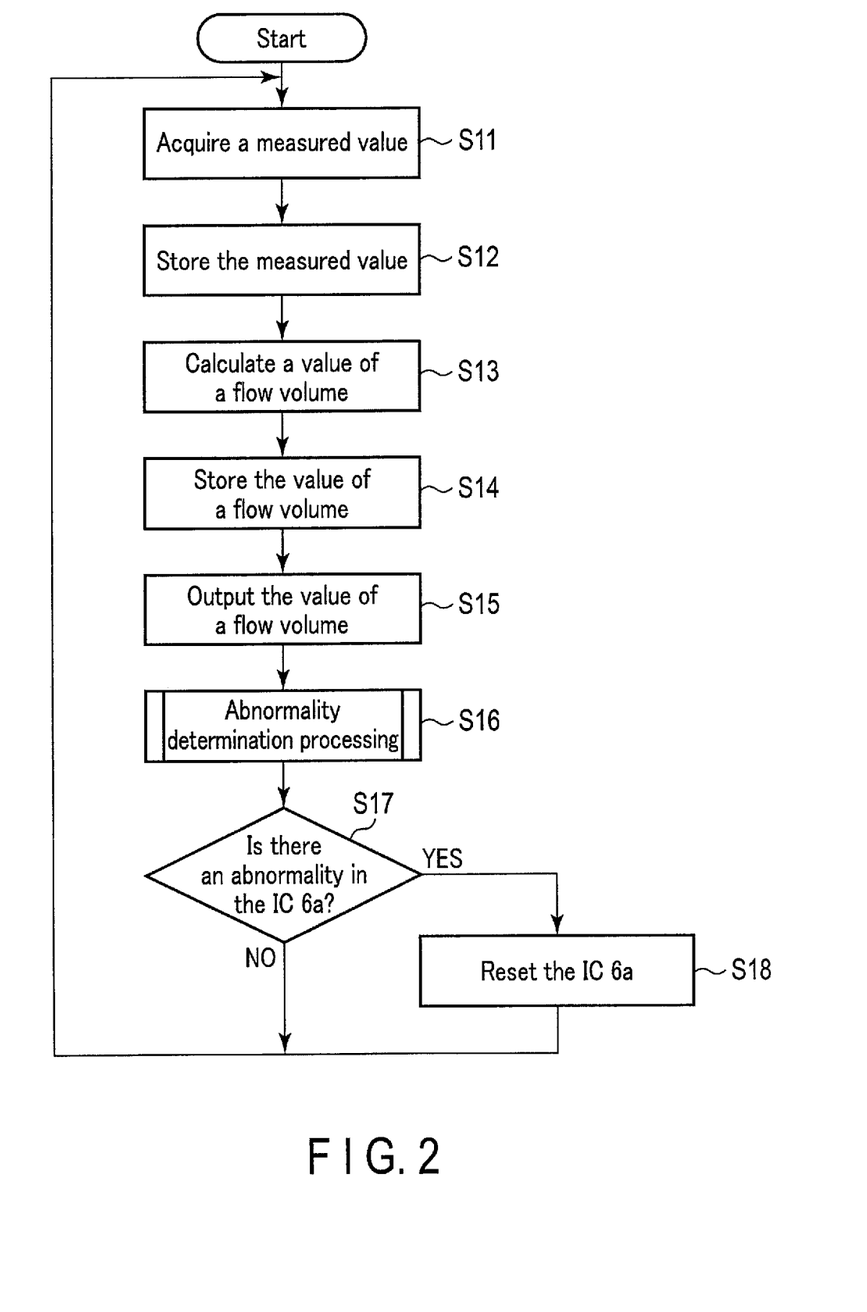
FIG. 2 is a flowchart showing an example of an operation of the electronic device according to the first embodiment.

FIG. 2 is a flowchart illustrating the example of the operation of the electronic device 100.

First, the CPU 8 acquires a measured value of an induced electromotive force from the ADC 6 (S11). Namely, the detector 3 supplies a detected induced electromotive force to the amplifier circuit 4. When the induced electromotive force is supplied, the amplifier circuit 4 amplifies the supplied induced electromotive force and outputs it to the noise cancellation circuit 5. When the amplified induced electromotive force is supplied, the noise cancellation circuit 5 cancels noise and supplies the induced electromotive force to the ADC 6. When the induced electromotive force is supplied, the ADC 6 converts the value (measured value) of the induced electromotive force into a digital signal and supplies it to the CPU 8.

Upon acquiring the measured value of the induced electromotive force, the CPU 8 stores the measured value of the induced electromotive force in the memory 10 (S12). The CPU 8 calculates a value of a flow volume from the measured value of the induced electromotive force (S13). Upon calculating the value of the flow volume, the CPU 8 stores the value of the flow volume in the memory 10 (S14).

Upon storing the value of the flow volume in the memory 10, the CPU 8 outputs a digital signal indicating the value of the flow volume to the DAC 9 (S15). Upon receiving the digital signal, the DAC 9 converts the digital signal into an analog signal. Upon converting the digital signal into an analog signal, the DAC 9 transmits the analog signal to an external device through the communication circuit 13.

Upon outputting the value of the flow volume, the CPU performs abnormality determination processing to determine whether there is an abnormality that requires a hardware reset occurring in the IC 6a based on the measured value (S16). An example of an operation of the abnormality determination processing will be detailed later. The abnormality determination processing can be implemented discretionarily as long as it is after the measured value is acquired (e.g., after S11).

If determining that there is no abnormality that requires a hardware reset occurring in the IC 6a by the abnormality determination processing (S17, NO), the CPU 8 returns to S11.

If determining that there is an abnormality that requires a hardware reset occurring in the IC 6a by the abnormality determination processing (S17, YES), the CPU 8 transmits, to the reset circuit 7, a hardware reset signal to subject the IC 6a to a hardware reset (S18). Upon receiving the hardware reset signal, the reset circuit 7 performs a hardware reset on the IC 6a by stopping power supply to the IC 6a for a predetermined waiting time and thereafter restarting the power supply.

Upon transmitting the hardware reset signal, the CPU 8 returns to S11.

Figure 3:
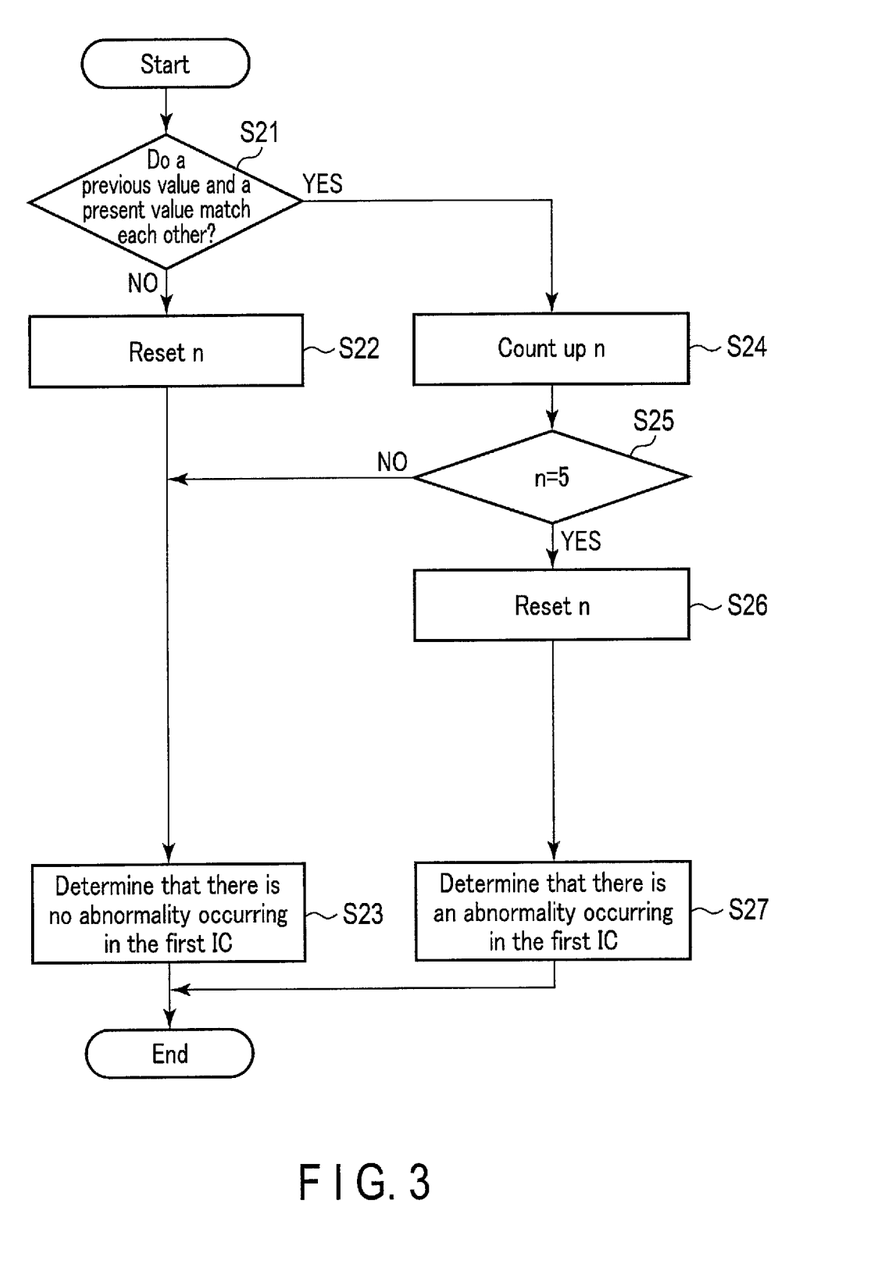
FIG. 3 is a flowchart showing an example of an operation of the electronic device according to the first embodiment.

Next, an example of the operation of the abnormality determination processing in which the CPU 8 determines whether there is an abnormality that requires a hardware reset occurring in the IC 6a (S16) will be described.

In this embodiment, the CPU 8 sets a counter for counting a counter value n in the memory 10.

First, the CPU 8 determines whether a measured value received from the ADC 6 and a measured value received from the ADC 6 immediately before it match each other (S21).

If determining that the measured value and the immediately preceding measured value do not match each other (S21, NO), the CPU 8 resets the counter value n (S22). Namely, the CPU 8 sets the counter value n to 0. Upon resetting the counter value n, the CPU 8 determines that there is no abnormality that requires a hardware reset occurring in the IC 6a (S23).

If determining that the measured value and the immediately preceding measured value match each other (S21, YES), the CPU 8 counts up the counter value n (S24). Upon counting up the counter value n, the CPU 8 determines whether the counter value n is a predetermined threshold value for abnormality determination (S25). In the present embodiment, a threshold value for abnormality determination is set to 5 as an example, and hereinafter is represented as a threshold value (5) for abnormality determination. However, the threshold value for abnormality determination is not limited to 5.

If determining that the counter value n is not the threshold value (5) for abnormality determination (S25, NO), the CPU 8 proceeds to S23.

If determining that the counter value n is the threshold value (5) for abnormality determination (S25, YES), the CPU 8 resets the counter value n (n=0) (S26). Upon resetting the counter value n, the CPU 8 determines that there is an abnormality that requires a hardware reset occurring in the IC 6a (S27).

By the above-described processing, the CPU 8 can determine whether there is an abnormality that requires a hardware reset occurring in the IC 6a based on the measured value received from the ADC 6. If determining that there is an abnormality in the IC 6a by the abnormality determination processing, the CPU 8 performs a hardware reset on the IC 6a by transmitting the hardware reset signal to the reset circuit 7 as the above-described processing of S17.

The electronic device having the above configuration can temporarily stop power supply to the IC that converts an analog signal to a digital signal and resets the IC if an abnormality occurs in the IC. As a result, the electronic device can resolve the abnormality by restarting the IC without stopping the entire power source.

In addition, the electronic device measures a predetermined object (e.g., flow volume) by using the detector. Thus, even if an abnormality occurs in the IC, the electronic device can continue measurement without being turned off. Also, in a case where the electronic device receives power supply from an upper device, even if the abnormality occurs in the IC, the abnormality can be solved without turning off the upper device. Accordingly, the electronic device or a system that includes the electronic device can stably continue measurement.

The electronic device 100 may be any device as long as it includes the IC that is subjected to a hardware reset by the reset circuit, and is not limited to the above-described flow meter. For example, the electronic device 100 may be a device that measures a flow volume of gas based on a value detected by a detector installed in a measurement tube in which the gas flows. The electronic device 100 may also be a measuring device that measures voltage, current, temperature, pressure, wind power, number of rotations, or the like. Furthermore, the electronic device 100 is not limited to a measuring device that measures a particular object, and need not be a measuring device that measures a particular object.

Second Embodiment

Next, the second embodiment will be described.

An electronic device 100 according to the second embodiment is different from the electronic device 100 according to the first embodiment in that the electronic device 100 according to the second embodiment resets an IC constituting the DAC 9 if an abnormality occurs in the IC in addition to resetting the IC (first IC) 6a constituting the ADC 6. Accordingly, the other parts are indicated by the same symbols, and a detailed description thereof is omitted.

Figure 4:
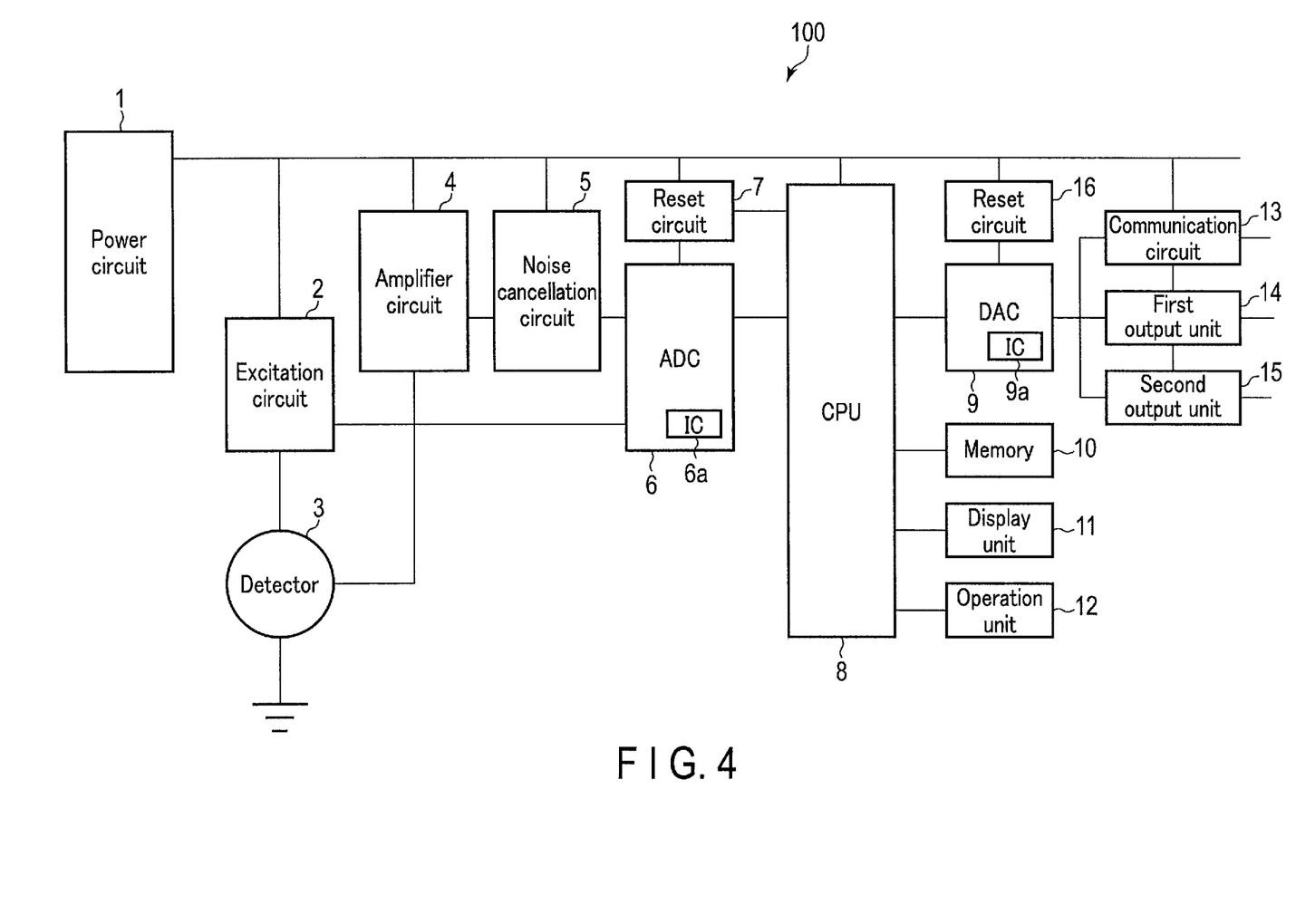
FIG. 4 is a block diagram showing a configuration example of a flow meter according to a second embodiment.

FIG. 4 shows a configuration example of the electronic device 100 according to the second embodiment.

As shown in FIG. 4, the electronic device 100 further includes a reset circuit 16. Also, the DAC 9 includes an IC (second IC) 9a.

The IC 9a constitutes the DAC 9. The IC 9a, for example, functions to convert the digital signal from the CPU 8 into an analog signal. The DAC 9 may be the IC 9a.

The reset circuit 16 (reset unit) is electrically connected to the CPU 8 and the IC 9a. The reset circuit 16 resets the IC 9a based on a signal from the CPU 8. Namely, the reset circuit 16 stops power supply to the IC 9a, and starts the power supply to the IC 9a again after a predetermined waiting (stopping) time elapses. The waiting time is a time needed to reset the IC 9a. For example, the waiting time may be determined according to the characteristics of the IC 9a. The waiting time may also be determined based on the capacitance in the IC 9a, etc.

Also, the reset circuit 16 may function as a power circuit that supplies power to the DAC 9 and the IC 9a. The reset circuit 16 may stop power supply to the DAC 9 and start power supply to the DAC 9 again after a predetermined time elapses.

Next, the function fulfilled by the CPU 8 will be described.

The CPU 8 has an abnormality determination function (determination unit) to determine whether there is an abnormality occurring in the IC 9a. By this abnormality determination function, the CPU 8 determines whether it is necessary to reset the IC 9a in terms of hardware (hereinafter referred to as a hardware reset). The hardware reset is a reset performed by physically stopping power supply to the IC 9a and thereafter starting power supply to the IC 9a again. The abnormality that requires the hardware reset is one that cannot be solved by a software reset (which is not a reset performed by physically stopping and starting power supply, but a reset performed by software by using a reset signal from the CPU 8, for example).

For example, the CPU 8 acquires a feedback of an analog signal output by the DAC 9. For example, the CPU 8 may acquire the feedback via a converter that converts the analog signal output by the DAC 9 into a digital signal.

The CPU 8 determines whether there is an abnormality occurring in the IC 9a based on the feedback. For example, the CPU 8 determines that there is an abnormality occurring in the IC 9a if there is no correlation between the value of the flow volume that is output to the DAC 9 and the value of the flow volume that is fed back.

For example, the CPU 8 calculates an output value ratio between the value of the flow volume output to the DAC 9 and the value of the flow volume output to the DAC 9 immediately before it. The CPU 8 also calculates a feedback value ratio between the value of the flow volume that is fed back and the value of the flow volume that was fed back immediately before it. If the output value ratio and the feedback value ratio do not match each other, the CPU 8 determines that there is an abnormality occurring in the IC 9a.

If the value of the flow volume output to the DAC 9 and the value of the flow volume that is fed back do not match each other, or if the ratio between them is not a predetermined ratio, the CPU 8 may determine that there is an abnormality occurring in the IC 9a. The method in which the CPU 8 determines that an abnormality is occurring in the IC 9a is not limited to a particular method.

The CPU 8 functions to transmit a hardware reset signal to subject the IC 9a to a hardware reset to the reset circuit 16 if determining that there is an abnormality that requires a hardware reset occurring in the IC 9a. If the CPU 8 transmits the hardware reset signal to the reset circuit 16, the reset circuit 16 stops power supply to the IC 9a, and supplies power to the IC 9a again after a predetermined waiting time elapses.

An example of an operation of the electronic device 100 will be described.

Figure 5:
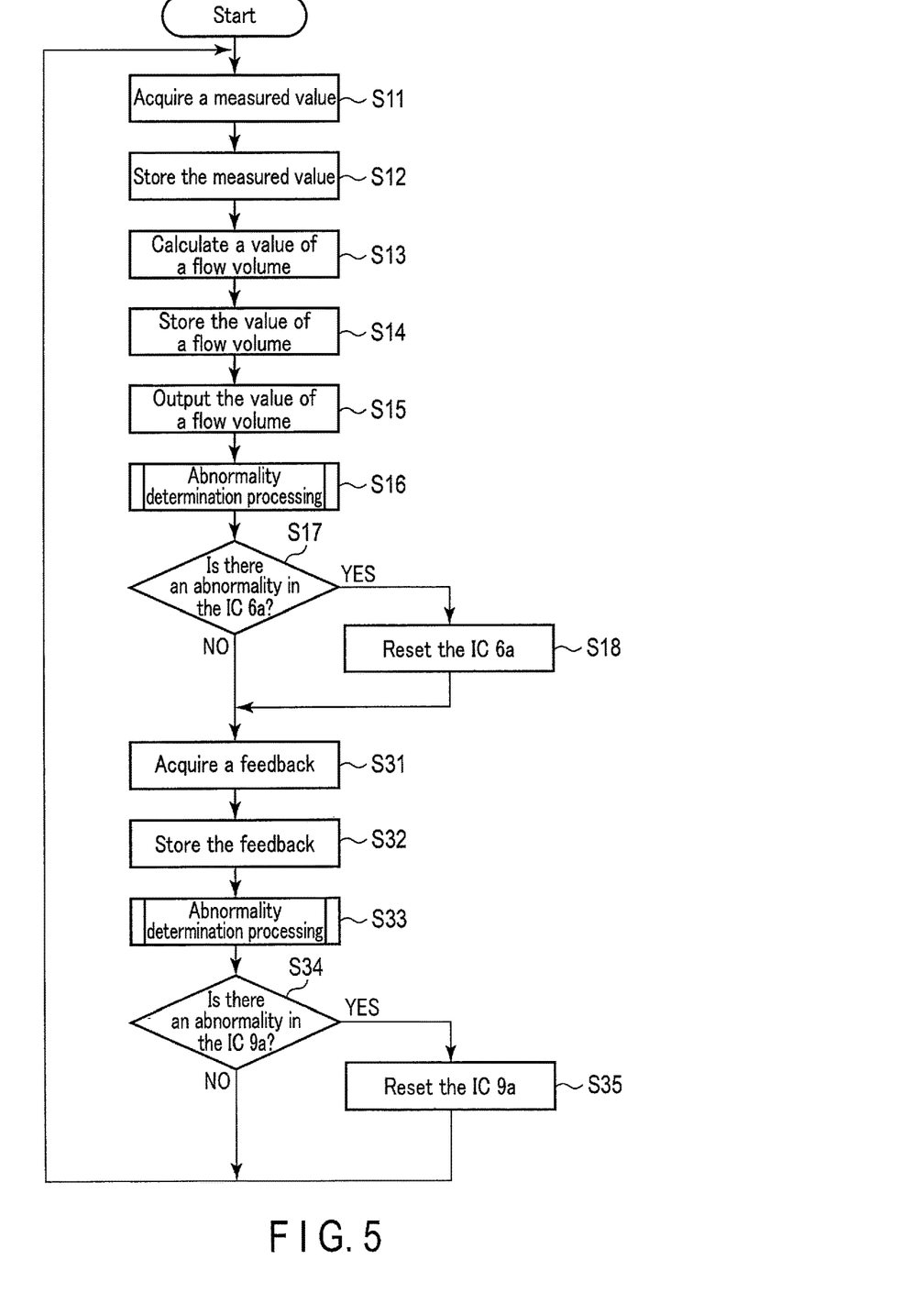
FIG. 5 is a flowchart showing an example of an operation of an electronic device according to the second embodiment.

FIG. 5 is a flowchart illustrating the example of the operation of the electronic device 100.

Since S11 to S16 are the same as those of the first embodiment, a detailed description thereof is omitted.

If determining that there is no abnormality that requires a hardware reset occurring in the IC 9a (S17, NO), or if transmitting the hardware reset signal to subject the IC 9a to a hardware reset (S18), the CPU 8 acquires a value of a flow volume that is fed back from the DAC 9 (S31).

Upon acquiring the value of the flow volume that is fed back, the CPU 8 stores the acquired value of the flow volume in the memory 10 (S32). Upon storing the value of the flow volume, the CPU 8 performs abnormality determination processing to determine whether there is an abnormality that requires a hardware reset occurring in the IC 9a (S34). An example of an operation of the abnormality determination processing will be detailed later.

If determining that there is no abnormality that requires a hardware reset occurring in the IC 9a by the abnormality determination processing of S33 (S34, NO), the CPU 8 returns to S11.

If determining by the abnormality determination processing of S33 that there is an abnormality that requires a hardware reset occurring in the IC 9a (S34, YES), the CPU 8 transmits to the reset circuit 16 a hardware reset signal to subject the IC 9a to a hardware reset (S35). Upon receiving the hardware reset signal, the reset circuit 16 performs a hardware reset on the IC 9a by stopping power supply to the IC 9a for a predetermined waiting time and thereafter restarting the power supply.

Upon transmitting the hardware reset signal, the CPU 8 returns to S11.

Figure 6:
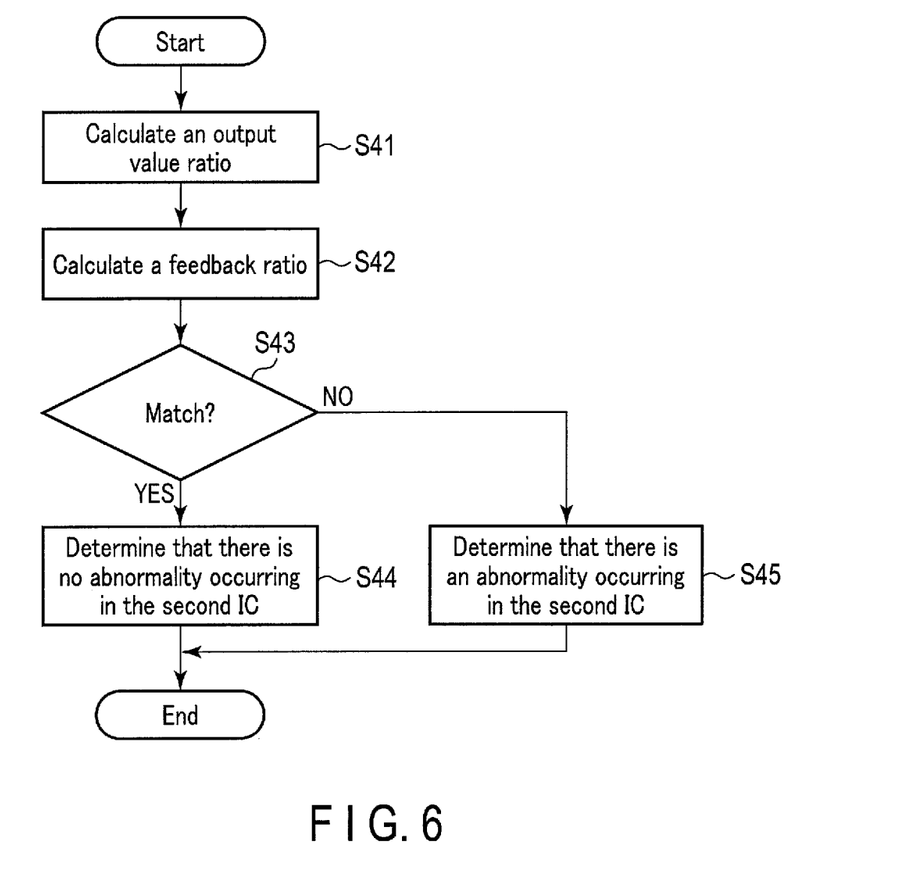
FIG. 6 is a flowchart showing an example of an operation of the electronic device according to the second embodiment.

An example of the operation in which the CPU 8 determines whether there is an abnormality occurring in the IC 9a (S33) will be described.

First, the CPU 8 calculates an output value ratio based on the value of the flow volume that is output and the value of the flow volume that was output immediately before it (S41). Upon calculating the output value ratio, the CPU 8 calculates a feedback value ratio based on the value of the flow volume that is fed back and the value of the flow volume that was fed back immediately before it (S42).

Upon calculating the feedback value ratio, the CPU 8 determines whether the output value ratio and the feedback value ratio match each other (S43).

Upon determining that the output value ratio and the feedback value ratio match each other (S43, YES), the CPU 8 determines that there is no abnormality that requires a hardware reset occurring in the IC 9a (S44).

Upon determining that the output value ratio and the feedback value ratio do not match each other (S43, NO), the CPU 8 determines that there is an abnormality that requires a hardware reset occurring in the IC 9a (S45).

The electronic device having the above configuration can temporarily stop power supply to the second IC and reset the second IC if an abnormality occurs in the second IC that converts a digital signal to an analog signal. As a result, the electronic device can solve the abnormality by restarting the second IC without stopping the entire power source.

Accordingly, the electronic device can operate more stably.

The invention claimed is:

1. An electronic device comprising:
    an integrated circuit; and
    a processor configured to:
        determine whether there is an abnormality occurring in the integrated circuit; and
        stop power supply to the integrated circuit when there is an abnormality occurring in the integrated circuit, and supply power to the integrated circuit after stopping the power supply for a particular period of time,
    wherein the integrated circuit converts a digital signal to an analog signal and the processor determines whether there is an abnormality occurring in the integrated circuit based at least in part on the digital signal input to the integrated circuit and the analog signal output by the integrated circuit.

2. The electronic device according to claim 1, wherein the processor determines that the abnormality is occurring in the integrated circuit when the abnormality cannot be solved by a software reset.

3. The electronic device according to claim 1, wherein the processor determines that the abnormality is occurring in the integrated circuit based at least in part on a ratio between a value of the digital signal input to the integrated circuit and a value of an immediately preceding digital signal input to the integrated circuit, and a ratio between a value of the analog signal output from the integrated circuit and a value of an immediately preceding analog signal output from the integrated circuit.

* * * * *